Patented Mar. 27, 1945

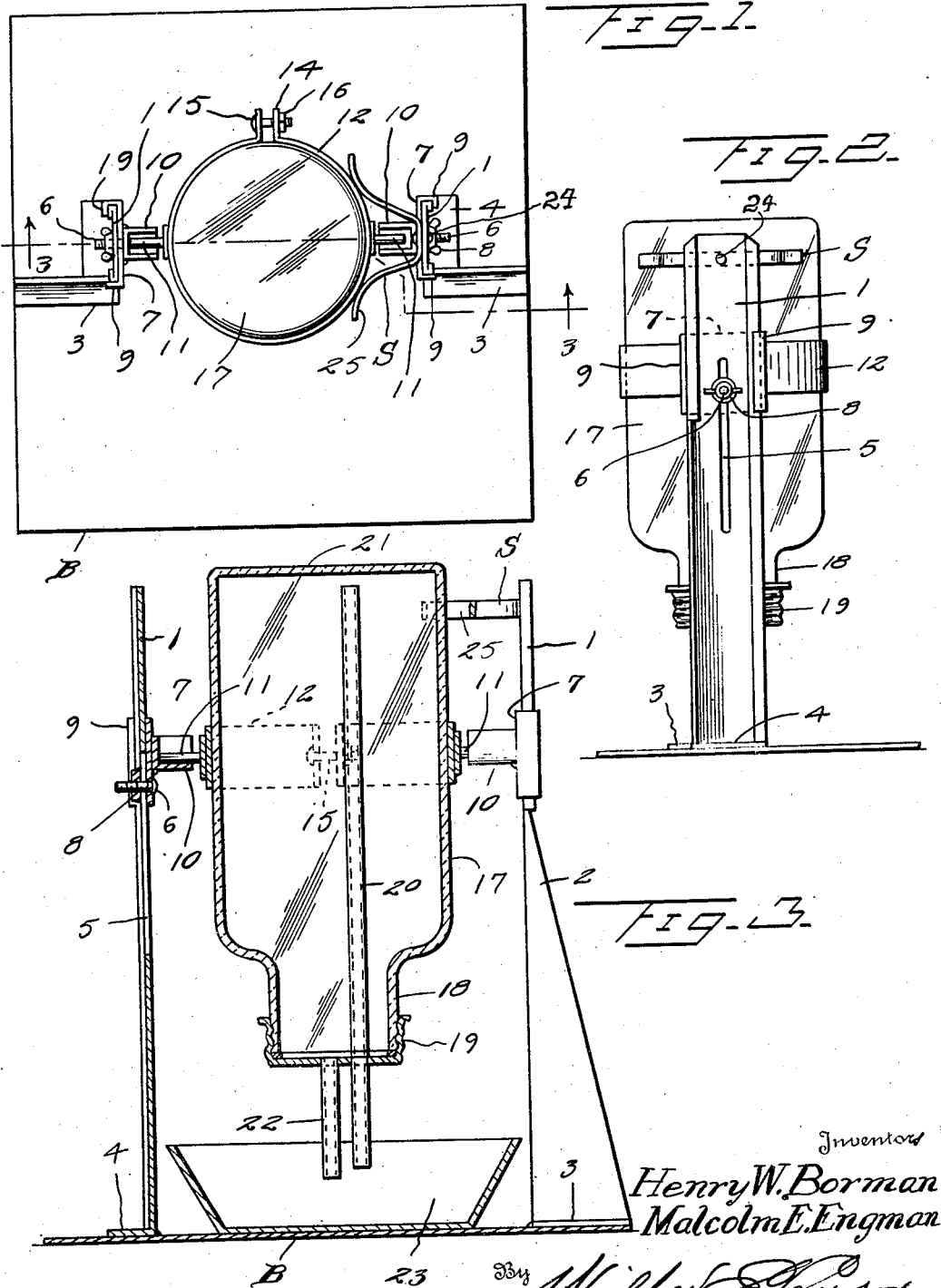

2,372,544

UNITED STATES PATENT OFFICE 2,372,544

WATERING DEVICE

Henry W. Borman and Malcolm E. Engman, Centerville, S. Dak.

Application May 21, 1943, Serial No. 487,934

2 Claims. (Cl. 248—137)

This invention relates to watering devices and has relation more particularly to a device of this kind of a barometric type, and it is primarily an object of the invention to provide a device of this kind which, while primarily intended for use in connection with the watering of fowl, can also be of a type to be used in the watering of stock.

It is also an object of the invention to provide a watering device of this kind wherein is eliminated the liability of overflow and wherein the water at all times is maintained clean, together with the elimination of liability of spillage.

A still further object of the invention is to provide a device of this kind including a supply receptacle having associated therewith means for supporting the same in a manner to permit the contents of the receptacle to be discharged therefrom as needed and whereby the entire content of the receptacle may be dispensed.

The invention consists in the details of construction and in the combination and arrangement of the several parts of our improved watering device whereby certain important advantages are attained, as will be hereinafter more fully set forth.

In order that our invention may be better understood, we will now proceed to describe the same with reference to the accompanying drawing, wherein:

Figure 1 is a view in top plan of a watering device constructed in accordance with an embodiment of our invention.

Figure 2 is a view in side elevation of the device as illustrated in Figure 1, and Figure 3 is a vertical sectional view taken substantially on the line 3—3 of Figure 1.

As disclosed in the accompanying drawing, B denotes a base plate of suitable dimensions and which is provided with the spaced upstanding and substantially flat supports 1. The lower portion of each of these supports along a side margin thereof is provided with a reinforcing flange 2, the lower end portion of which is provided with a laterally disposed flange 3 directly attached to the base plate B while the lower end of the support 1 proper is also provided with a laterally disposed flange 4 suitably anchored to the base plate B.

The upper portions of the supports 1 are provided with a longitudinally disposed slot 5 through which passes from within a headed member or bolt 6 which is also disposed through a slide 7. Threaded upon the outer or free portion of the bolt 6 is a wing nut 8 whereby the slide 7 may be effectively clamped or held in selected position along the slot 5.

This slide 7 is provided along its side margins with the flanges 9 which overlie the side edges of the support 1 whereby the slide 7 is held against rocking or turning movement. Each of the slides 7 rigidly carries an inwardly disposed and substantially U-shaped bearing bracket 10 into which is freely seated from above an outstanding trunnion 11 carried by a split clamping member or ring 12. The trunnions 11 of the member or ring 12 are substantially diametrically opposed and the free ends of the member or ring 12 are provided with the outstanding lugs 14 through which is directed the headed shank or bolt 15 upon which threads a nut 16.

By proper manipulation of the nut 16, the ring or member 12 may be effectively clamped around the central portion of a glass jar 17 or kindred receptacle of desired dimensions and capacity. When the jar 17 is applied, the neck 18 is downwardly disposed and which neck has detachably engaged therewith a conventional closing cap 19 herein shown as of a screw type.

Extending through the cap 19 and secured thereto is an elongated tube 20. This tube 20 is of a length to have one end terminate closely adjacent to the bottom end 21 of the jar or receptacle 17 when the cap 19 is applied, with its opposite end terminating a desired distance outwardly beyond the cap 19. The cap 19 also carries a short tube 22 which extends outwardly therefrom and is of a length to terminate slightly beyond the outer end of the tube 20. The tube 22 does not extend beyond the inner face of the cap 19 in order to assure the entire content of the jar or receptacle 17 being discharged when the device is in operative assembly.

After the jar or receptacle 17 has been filled with water, it is placed in inverted position between the supports 1 with the trunnion 11 freely received within the bearing brackets 10 and the outer end portions of the tubes 20 and 22 extend within a basin 23 or other utensil placed upon the base B and from which the chicken or the like drinks. When the water level within the basin 23 is above the lower or exterior end of the tube 20, flow of water from within the jar or receptacle 17 out through the tube 22 is prevented. However, as the water level within the basin 23 lowers and the lower or outer end of the tube 20 opens, water will flow out through the tube 22 into the basin 23 until the water level is again raised to close the lower or outer end of the tube 20.

One of the supports 1 at its upper portion has anchored thereto, as at 24, the central or intermediate portion of a substantially U-shaped spring S. The side arms 25 of this spring S are disposed outwardly on predetermined curvatures and the outer extremities of the arms 25 have tensioned contact with the periphery of the jar or receptacle 17 at circumferentially spaced points, whereby the jar or receptacle is normally held against swinging or rocking movement. However, if the lower portion of the applied jar or receptacle should be subjected to abnormal pressure, the jar or receptacle 17 will overcome the resistance offered by the arms 25 and swing under the action of such force and thereby substantially eliminate the liability of the device being upset.

It is believed to be obvious that the jar or receptacle 17 may be readily supported with respect to the basin 23 or the like upon proper adjustment of the slides 7 along the supports 1.

From the foregoing description it is thought to be obvious that a watering device constructed in accordance with our invention is particularly well adapted for use by reason of the convenience and facility with which it may be assembled and operated.

What is claimed is:

1. A watering fountain receptacle support comprising a base, a pair of spaced vertically disposed standards carried by the base, each of said standards comprising a flat relatively thin strip of material, a pair of slides each comprising a plate having inturned opposite edge portions adapted for sliding engagement over longitudinal edges of the standards to dispose the plate upon the inner side of the standard, said slides having limited sliding movement on the standards, means for securing the slides to the standards, a rigid substantially U-shaped upwardly opening bearing bracket carried by each slide, and a receptacle securing band adapted to be secured about and support a receptacle and designed for disposition between the standards and the said bearing brackets, said receptacle securing band including integral diametrically oppositely positioned trunnions each adapted for disposition within a bearing bracket.

2. A watering device of the character stated, comprising a base plate, two vertically disposed spaced parallel standards mounted upon the base plate and each formed of a strip of sheet metal, each of said standards having an integral longitudinal edge extension throughout substantially the lower half of its length and forming a brace flange for the standard, the lower edge of said brace flange being turned to form a foot flange secured to the plate, the wide faces of said standards being in opposed relation, a slide member carried by each standard and comprising a plate disposed across the inner face of each standard and having each of its two vertical edges turned to form a guide each slidably receiving a vertical edge of the adjacent standard, means carried by each slide plate for securing the latter in adjusted position upon the supporting standard, a bearing bracket carried upon the inner side of each slide plate and a receptacle securing band carrying integral diametrically positioned trunnions each adapted to position within a bearing bracket.

HENRY W. BORMAN.
MALCOLM E. ENGMAN.